United States Patent
Chai et al.

(10) Patent No.: US 10,241,276 B2
(45) Date of Patent: Mar. 26, 2019

(54) DUSTPROOF CAP OF OPTICAL FIBER ADAPTER, AND OPTICAL FIBER CONNECTION ASSEMBLY

(71) Applicant: CommScope Telecommunications (Shanghai) Co. Ltd., Shanghai (CN)

(72) Inventors: Xiongliang Chai, Shanghai (CN); Wenyong Fan, Shanghai (CN); Weili Zhang, Shanghai (CN)

(73) Assignee: CommScope Telecommunications (Shanghai) Co., Ltd. (CN)

( * ) Notice: Subject to any disclaimer, the term of this patent is extended or adjusted under 35 U.S.C. 154(b) by 0 days.

(21) Appl. No.: 15/559,303

(22) PCT Filed: Mar. 18, 2016

(86) PCT No.: PCT/CN2016/076704
§ 371 (c)(1),
(2) Date: Jan. 29, 2018

(87) PCT Pub. No.: WO2016/146081
PCT Pub. Date: Sep. 22, 2016

(65) Prior Publication Data
US 2018/0196201 A1   Jul. 12, 2018

(30) Foreign Application Priority Data
Mar. 18, 2015 (CN) .......................... 2015 1 0119797

(51) Int. Cl.
*G02B 6/36* (2006.01)
*G02B 6/38* (2006.01)

(52) U.S. Cl.
CPC ............. *G02B 6/3849* (2013.01); *G02B 6/36* (2013.01); *G02B 6/38* (2013.01); *G02B 6/387* (2013.01);
(Continued)

(58) Field of Classification Search
CPC .................................................. G02B 6/3849
See application file for complete search history.

(56) References Cited

U.S. PATENT DOCUMENTS 6,188,825 B1   2/2001   Bandy
6,227,717 B1   5/2001   Ott
(Continued)

FOREIGN PATENT DOCUMENTS

CN        201673299 U    12/2010
CN        201812056 U     4/2011
(Continued)

OTHER PUBLICATIONS

International Search Report and Written Opinion of the International Searching Authority for corresponding International Patent Application No. PCT/CN2016/076704 dated Jun. 22, 2016, 9 pages.
(Continued)

*Primary Examiner* — Chris Chu
(74) *Attorney, Agent, or Firm* — Merchant & Gould P.C.

(57) ABSTRACT

An optical fiber connector dust cap made of transparent material and suitable to be fitted in a port of an optical fiber adapter, and an indicator lamp provided at a port of the optical fiber adapter. A reflective surface is provided inside the dust cap, and an optical fiber connector is inserted into another port of the optical fiber adapter. A light emitted from the indicator lamp hits one side of the reflective surface, and is then reflected towards the external end section of the dust cap by the reflective surface, and is output from the external end section of the dust cap. Allowing an operator to clearly see the operational status of the indicator lamp on the optical fiber adapter, at the external end section of the dust cap. Meanwhile, the laser emitted by the optical fiber of the fiber jumper optical fiber connector hits the other side of the reflective surface, and is then reflected towards the side section of the dust cap by the reflective surface, and is output (Continued)

from the side section of the optical fiber adapter, instead of being output from the external end section of the dust cap. As a result of this, operator eye injuries due to laser output from fiber jumpers are effectively prevented.

15 Claims, 2 Drawing Sheets

(52) U.S. Cl.
CPC .......... *G02B 6/3825* (2013.01); *G02B 6/3895* (2013.01)

(56) References Cited

U.S. PATENT DOCUMENTS

| | | | |
|---|---|---|---|
| 6,554,485 | B1 | 4/2003 | Beatty |
| 6,634,798 | B2 | 10/2003 | Cheng |
| 7,164,840 | B2 | 1/2007 | Hsieh |
| 7,274,843 | B2 | 9/2007 | James, IV |
| 7,329,049 | B2 | 2/2008 | Meek |
| 7,349,619 | B2 | 3/2008 | Beck |
| 7,389,024 | B2 | 6/2008 | Oron |
| 7,565,053 | B2 | 7/2009 | Zimmel |
| 8,041,177 | B2 | 10/2011 | Zimmel |
| 2002/0090180 | A1 | 7/2002 | Silverbrook |
| 2003/0002810 | A1 | 1/2003 | Cheng |
| 2003/0123812 | A1 | 7/2003 | Beatty |
| 2005/0053332 | A1 | 3/2005 | Doerr |
| 2005/0135772 | A1 | 6/2005 | Nield |
| 2007/0183716 | A1 | 9/2007 | Suzuki |
| 2007/0217749 | A1 | 9/2007 | Jong |
| 2008/0310795 | A1* | 12/2008 | Parkman, III ....... G02B 6/3849 385/60 |
| 2013/0251311 | A1 | 9/2013 | Yu et al. |

FOREIGN PATENT DOCUMENTS

| | | |
|---|---|---|
| CN | 104160313 A | 11/2014 |
| JP | H0486706 A | 3/1992 |
| JP | 2004-325522 A | 11/2004 |
| JP | 2006-235502 A | 9/2006 |

OTHER PUBLICATIONS

Extended European Search Report dated Oct. 17, 2018 in European application No. 16764261.0 (9 pages).
Two photographs of what is believed to be a commercial embodiment similar to the adapter plug disclosed by U.S. Patent Application Publication No. US 2007/0217749, filed Mar. 14, 2006.
XGLO Jumpers & Pigtails, Siemon, 2 pages (Copyright 2005).

* cited by examiner

DUSTPROOF CAP OF OPTICAL FIBER ADAPTER, AND OPTICAL FIBER CONNECTION ASSEMBLY

RELATED APPLICATIONS REFERENCED AND QUOTED

The present application claims the rights and interests of Chinese patent application no. 201510119797.1 submitted to the State Intellectual Property Office on Mar. 18, 2015, the entire disclosed contents of which are quoted herein. This application is also a National Stage Application of PCT/CN2016/076704, filed on Mar. 18, 2016, which claims the benefit of Chinese patent application no. 201510119797.1 submitted to the State Intellectual Property Office on Mar. 18, 2015. To the extent appropriate, a claim of priority is made to each of the above disclosed applications.

TECHNOLOGICAL FIELD

The present invention relates to an optical fibre adapter and an optical fibre connection assembly comprising the dust cap.

BACKGROUND

At present, fibre optic adapter dust caps are mainly used to prevent dust from entering the fibre optic adapter. In use, the dust cap is inserted into one port (the user end) of the fibre optic adapter, and a fibre optic connector is inserted into the other port (the fibre jumper end), of the fibre optic adapter.

In the prior art, the two main technical solutions for a dust cap are as follows: (1) in an intelligent fibre optic management system, the dust cap of the fibre optic adapter is made of transparent material, therefore, the operator may see the operational status of the indicator lamp provided in the bottom section of the fibre optic adapter through the dust cap; (2) in a standard fibre optic adapter, the fibre optic adapter is made of black (opaque) or dark (semi-transparent) material, therefore, laser from the optical fibre connector at the fibre jumper end of the optical fibre adapter cannot penetrate the user end of the optical fibre adapter, thus preventing operator eye injuries.

In respect of the prior art, if the dust cap is made of transparent material, the operator can see the operational status of the indicator lamp provided in the bottom section of the optical fibre adapter, but, when a dust cap of transparent material is used, the laser from the fibre jumper at the other end of the optical fibre adapter may penetrate through the dust cap, exiting the external end face of the dust cap, therefore the use of dust caps of transparent material cannot prevent penetration of the laser from the other end of the optical fibre adapter, and operator eye injuries can easily occur. If the dust cap is made of black or dark coloured material, it can block the laser transmitted from the other end of the optical fibre adapter, but the operator cannot see the operational status of the indicator lamp.

Furthermore, in the prior art, even if the dust cap is made of the transparent material, due to the light emitted from the indicator lamp being scattered in all directions, under bright sunlight outdoors, the operator cannot clearly or easily see the operational status of the indicator lamp.

SUMMARY

The aim of the present invention is to overcome at least one aspect of the above drawbacks of the prior art.

One objective of the present invention is to provide an optical fibre connector dust cap, which not only prevents dust from entering the optical fibre adapter, but also allows the operator to clearly see the operational status of the indicator lamp provided on the optical fibre adapter and effectively protect against operator eye injuries caused by laser emitted from the fibre jumper at the fibre jumper end of the optical fibre adapter.

According to one aspect of the present invention an optical fibre connector dust cap is provided, suited to fit within a port of the optical fibre adapter, an indicator lamp being provided at the one port of the optical fibre adapter, said dust cap being constructed of transparent material. A reflective surface is provided inside the dust cap. When the dust cap is fitted within a port of the optical fibre adapter, and when a fibre jumper optical fibre connector is inserted into another port of the optical fibre adapter: (i) light emitted from the indicator lamp hits one side of the reflective surface, and is reflected towards the external end section of the dust cap by the reflective surface, penetrating the external end section of the dust cap; and (ii) laser emitted from the optical fibre in the optical fibre connector hits the other side of the reflective surface, and is reflected towards the side section of the dust cap by the reflective surface, penetrating beyond the side section of the optical fibre adapter.

According to an exemplary embodiment of the present invention, when the dust cap is fitted to one port of the optical fibre adapter, an angle between the reflective surface and an axis of the optical fibre adapter is larger than 0 degrees and less than 90 degrees.

According to another exemplary embodiment of the present invention, when the dust cap is fitted to one port of the optical fibre adapter, the angle between the reflective surface and the axis of the optical fibre adapter is larger than 30 degrees and less than 60 degrees.

According to another exemplary embodiment of the present invention, when the dust cap is fitted in the one port of the optical fibre adapter, the angle between the reflective surface and the axis of the optical fibre adapter is equal to 45 degrees.

According to another exemplary embodiment of the present invention, the external end section of the dust cap has a light output surface, the light output from the indicator lamp penetrating out from said light output surface.

According to another exemplary embodiment of the present invention, the light output surface is perpendicular to the axis of the optical fibre adapter.

According to another exemplary embodiment of the present invention, the dust cap has an insertion section suitable to be inserted into and retained in a port of the optical fibre adapter; and the reflective surface is formed within the insertion section of the dust cap.

According to another exemplary embodiment of the present invention, a chamber is formed within the bottom section of the insertion section of the dust cap, and the reflective surface is formed out of an inclined wall surface of the chamber.

According to another exemplary embodiment of the present invention, the dust cap has a flange between the insertion section and the external end section; and when the dust cap is fitted in a port of the optical fibre adapter, the flange abuts against the external end surface of the port of the optical fibre adapter.

According to another exemplary embodiment of the present invention, the indicator lamp is an LED lamp.

According to another exemplary embodiment of the present invention, the indicator lamp is provided on a bottom wall of the optical fibre adapter.

According to another aspect of the present invention, there is provided a fibre optic connection assembly, comprising: an optical fibre connector, an optical fibre adapter having a first port and a second port opposite to the first port, an indicator lamp being provided at the first port; the above mentioned dust cap fitted in the first port of the optical fibre adapter to seal the first port; and a fibre jumper optical fibre connector inserted into the second port of the optical fibre adapter.

According to an exemplary embodiment of the present invention, an electronic chip is provided in the optical fibre connector to store information identifying the fibre jumper optical fibre; and a signal reader is provided on the optical fibre adapter to read the fibre jumper optical fibre identification information stored in the electronic chip.

According to another exemplary embodiment of the present invention, the signal reader and the indicator lamp are both mounted on the same circuit board; and the circuit board is mounted in the bottom section of the optical fibre adapter.

According to another exemplary embodiment of the present invention, the optical fibre adapter is made of transparent material.

In the above various exemplary embodiments of the present invention, a reflective surface is provided inside the dust cap. The dust cap is fitted in a port of the optical fibre adapter; an optical fibre connector is inserted into the other port of the optical fibre adapter. A light emitted from the indicator lamp hits one side of the reflective surface, and is then reflected towards the external end section of the dust cap by the reflective surface, and is output from the external end section of the dust cap. Thereby, the operator may clearly see the operational status of the indicator lamp on the optical fibre adapter at the external end section of the dust cap. Meanwhile, laser emitted from the fibre jumper optical fibre connector hits the other side of the reflective surface, and is then reflected towards the side section of the dust cap by the reflective surface, and is output from the side section of the optical fibre adapter, instead of being output from the external end section of the dust cap. In this manner operator eye injuries due to laser emitted from the fibre jumper optical fibre are effectively prevented.

The following description of the present invention making reference to the appended diagrams will make other objectives and advantages of the present invention obvious, and can help to furnish a full understanding of the present invention.

DETAILED DESCRIPTION

The following provides embodiments, which when taken in conjunction with the appended diagrams, provide a more detailed description of this invention. In the description, the same or similar components are represented by the same or similar numbering as those in the appended diagrams. The following embodiments taken with reference to the appended diagrams provides an explanation of the overall concepts embodied by this invention, and should not be construed as limiting the present invention.

Apart from this, in the following detailed descriptions, for purposes of explanation, numerous specific details are set forth in order to provide a thorough understanding of the disclosed embodiments. It will be apparent, however, that one or more embodiments may be possible without these specific details. In other instances, structures and devices which are common knowledge are shown graphically in order to simplify the appended diagrams.

According to a general concept of the present invention, a dust cap is provided for an optical fibre adapter, the dust cap is made of transparent material and suitable to be fitted in a port of the optical fibre adapter, and an indicator lamp is provided at one port of the optical fibre adapter. A reflective surface is provided inside the dust cap; when the dust cap is fitted in a port of the optical fibre adapter, and when the optical fibre connector is inserted into another port of the optical fibre adapter, (i) a light emitted from the indicator lamp hits one side of the reflective surface, and is then reflected towards the external end section of the dust cap by the reflective surface, and is output from the external end section of the dust cap; and (ii) a laser emitted from an optical fibre in the optical fibre connector hits the other side of the reflective surface, and is then reflected towards the side section of the dust cap by the reflective surface, and is output from the side section of the optical fibre adapter.

Figure 1:
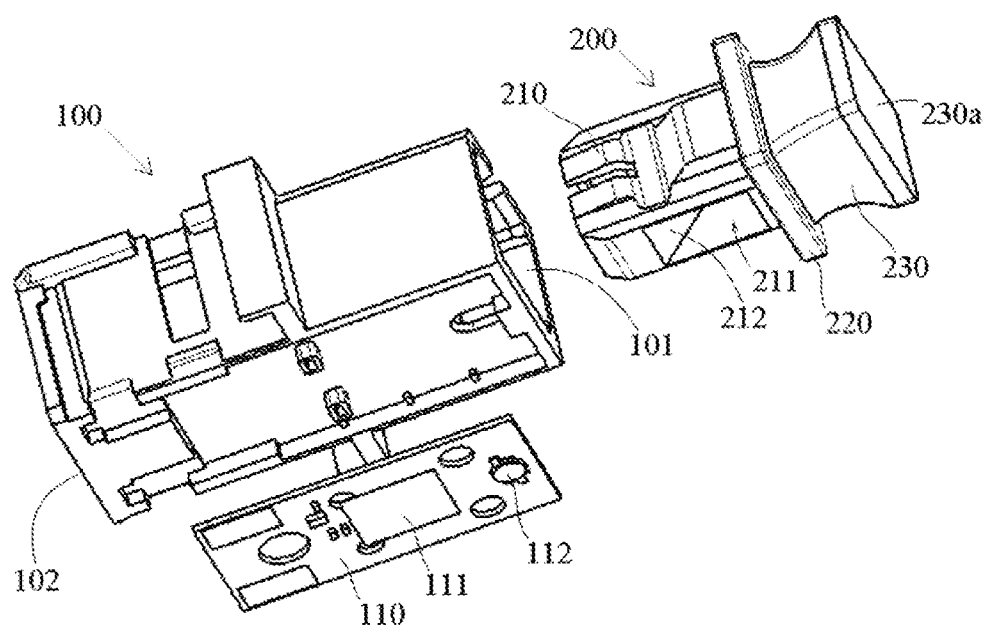
FIG. 1 is an illustrative exploded view of the dust cap and optical fibre adapter according to an exemplary embodiment of the present invention.
Figure 2:
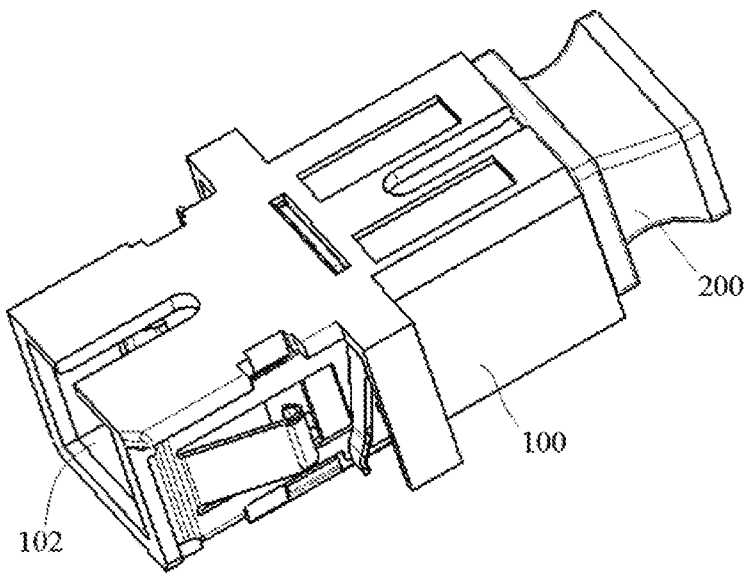
FIG. 2 is an illustrative assembled view of the dust cap and the optical fibre adapter according to an exemplary embodiment of the present invention.
Figure 3:
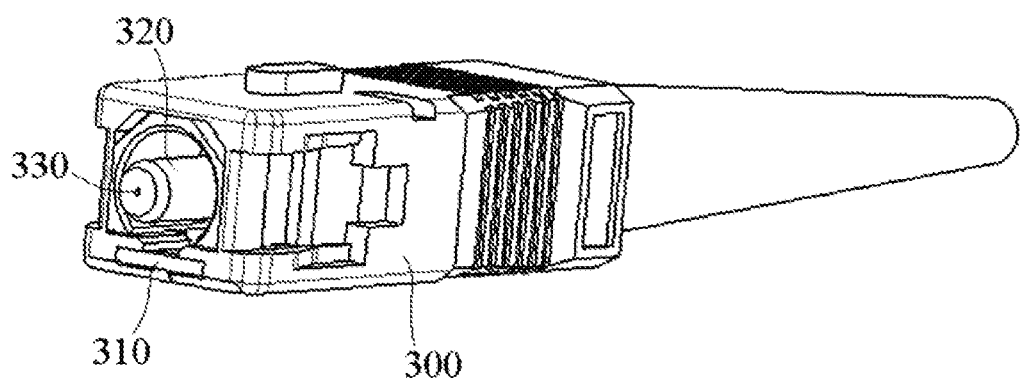
FIG. 3 is an illustrative perspective view of an optical fibre connector suitable for insertion into the fibre jumper connector at the fibre jumper end of the optical fibre adapter of FIGS. 1 and 2.
Figure 4:
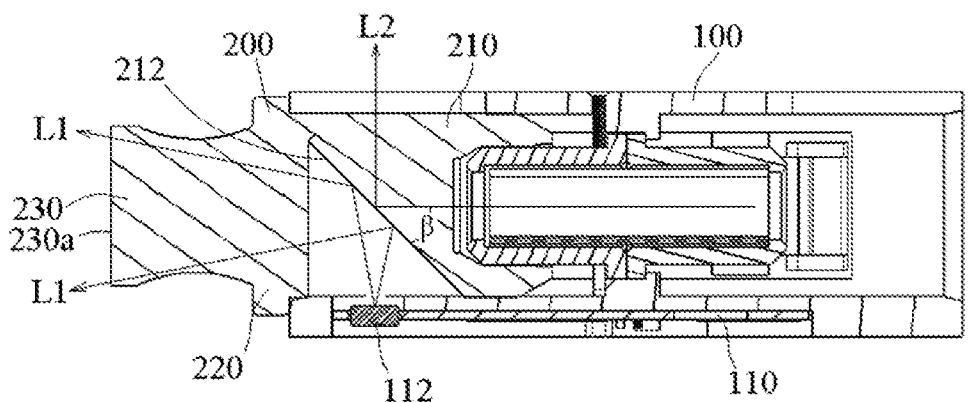
FIG. 4 is a cross sectional view of the assembled dust cap and optical fibre adapter of FIG. 2.

FIG. 1 is an illustrative exploded view of a dust cap 200 and an optical fibre adapter 100 according to an exemplary embodiment of the present invention; FIG. 2 is an illustrative assembled view of the dust cap 200 and the optical fibre adapter 100 according to an exemplary embodiment of the present invention; FIG. 3 is an illustrative perspective view of an optical fibre connector 300 suitable to be inserted into the fibre jumper end of the optical fibre adapter 100 of FIGS. 1 and 2; and FIG. 4 is a cross sectional view of the assembled dust cap 200 and optical fibre adapter 100 of FIG. 2.

In an exemplary embodiment of the present invention, an optical fibre connector dust cap is disclosed. As shown in FIGS. 1 and 2, the dust cap is made of transparent material and suitable to fit within port 101 (the user end) of the optical fibre adapter 100, being for the purpose of preventing dust from entering the optical fibre adapter 100.

As is clearly shown in FIG. 1, an indicator lamp 112 is provided at port 101 of the optical fibre adapter 100 in the embodiment shown, being for the purpose of indicating the operational status of the optical fibre adapter.

As shown in FIGS. 1 to 4, in an exemplary embodiment, a reflective surface 212 is provided inside the dust cap 200. When the dust cap 200 is fitted within port 101 of the optical fibre adapter 100, and when the optical fibre connector 300 is inserted into the other port 102 of the optical fibre adapter 100, (i) light L1 emitted from the indicator lamp 112 hits one side of the reflective surface 212 (the left side in FIG. 4), and is then reflected towards the external end section 230 of the dust cap 200 by the reflective surface 212, and is output from the external end section 230 of the dust cap 200; and (ii) laser L2 emitted from a fibre jumper optical fibre 330 in the optical fibre connector 300 hits the other side of the reflective surface 212 (the right side in FIG. 4), and is then reflected towards the side section of the dust cap 200 by the reflective surface 212, and is output from the side section of the optical fibre adapter 100.

In an exemplary embodiment of the present invention, as shown in FIG. 4, when the dust cap 200 is fitted in port 101 of the optical fibre adapter 100, the angle β between the reflective surface 212 and the axis of the optical fibre adapter 100 is larger than 0 degrees and less than 90 degrees.

In another exemplary embodiment, as shown in FIG. 4, when the dust cap 200 is fitted in port 101 of the optical fibre adapter 100, the angle β between the reflective surface 212 and the axis of the optical fibre adapter 100 is larger than 30 degrees and less than 60 degrees.

In the embodiment shown in FIG. 4, when the dust cap 200 is fitted in port 101 of the optical fibre adapter 100, the angle β between the reflective surface 212 and the axis of the optical fibre adapter 100 is equal to 45 degrees. In this case, the laser L2 emitted from the fibre jumper optical fibre 330 in the optical fibre connector 300 may be output to the exterior of the optical fibre adapter 100 in a direction perpendicular to the axis along the optical fibre adapter 100.

In actual usage, optical fibre adapters 100 are generally densely installed in fibre junction boxes in rows. Thereby, only a very narrow gap is left at the sides of the optical fibre adapters 100. In this way, the operator can only see the indicator lamp on the optical fibre adapter 100 from the external end section of the dust cap 200 or the optical fibre adapter 100 when inserting or removing the optical fibre connectors 300. In the above embodiments of the present invention, the light L1 emitted from the indicator lamp 112 is output from the external end section 230 of the dust cap 200, therefore, the operator may clearly see the operational status of the indicator lamp 112 at the external end section 230 of the dust cap 200. Also, since the laser L2 emitted from the fibre jumper optical fibre 330 in the optical fibre connector 300 is output from the side section of the optical fibre adapter 100, instead of being output from the external end section 230 of the dust cap 200, the operator cannot see the laser output from the side portion of the optical fibre adapter 100. In this way, operator eye injuries caused by the laser emitted from the fibre jumper optical fibre 330 are effectively prevented.

As shown in FIG. 3, in the embodiment shown, the optical fibre connector 300 comprises a ferrule 320, the fibre jumper optical fibre 330 being retained by the ferrule 320.

As shown in FIGS. 1 and 4, in an exemplary embodiment of the present invention, the external end section 230 of the dust cap 200 has a light output surface (may be referred to as a light output window) 230a, the light L1 emitted from the indicator lamp 112 being output via the light output surface 230a.

In an embodiment, as shown in FIG. 4, the light output surface 230a is arranged perpendicular to the axis of the optical fibre adapter 100.

As shown in FIGS. 1, 2 and 4, in an embodiment, the dust cap 200 has an insertion section 210 suitable to be inserted into and retained within port 101 of the optical fibre adapter 100. The reflective surface 212 is located within the insertion section 210 of the dust cap 200.

As shown in FIGS. 1, 2 and 4, in an embodiment, a chamber 211 is formed within the bottom section of the insertion section 210 of the dust cap 200, and the reflective surface 212 constitutes an inclined wall surface of the chamber 211.

As shown in FIGS. 1, 2 and 4, in an exemplary embodiment of the present invention, the dust cap 200 has a flange 220 formed between the insertion section 210 and the external end section 230. When the dust cap 200 is fitted in port 101 of the optical fibre adapter 100, the flange 220 abuts against the external end surface of port 101 of the optical fibre adapter 100, thereby improving the sealing of the optical fibre adapter 100.

As shown in FIGS. 1, 2 and 4, in an embodiment, the indicator lamp 112 is an LED lamp. The indicator lamp 112 is provided on the bottom wall of the optical fibre adapter 100.

In another exemplary embodiment of the present invention, an optical fibre connection assembly is disclosed. As shown in FIGS. 1 to 4, the optical fibre connection assembly mainly comprises the optical fibre adapter 100, the above mentioned dust cap 200 and the optical fibre connector 300.

As shown in FIGS. 1 to 4, in an embodiment, the optical fibre adapter 100 has a first port 101 and a second port 102 opposite to the first port 101. An indicator lamp 112 is provided at the first port 101. The dust cap 200 is fitted within the first port 101 of the optical fibre adapter 100, and is for the purpose of sealing the first port 101. The optical fibre connector 300 is inserted into the second port 102 of the optical fibre adapter 100.

As shown in FIG. 3, in an embodiment, an electronic chip 310 is provided within the optical fibre connector 300, said electronic chip 310 being provided to store information identifying the fibre jumper optical fibre 330. A signal reader 111 is provided on the optical fibre adapter 100, said signal reader 111 being for the purpose of reading the fibre jumper optical fibre 330 identification information stored in the electronic chip 310. In this way, the fibre jumper optical fibre 330 being read may be assigned to a specific user terminal, thus improving the efficiency of interconnection of the optical fibres, in addition to preventing connection of fibre jumper optical fibres 330 to incorrect user terminals.

In an exemplary embodiment of the present invention, as shown in FIG. 1, the signal reader 111 and the indicator lamp 112 are both mounted on the same circuit board 110; additionally, the circuit board 110 is mounted in the bottom section of the optical fibre adapter 100.

In an exemplary embodiment of the present invention, the laser L2 emitted from the optical fibre connector 300 is reflected by the reflective surface 212 to a side-wall of the optical fibre adapter 100, instead of being output from the external end section 230 of the dust cap 200. Thereby, even if the optical fibre adapter 100 and the dust cap 200 are both made of transparent material, the laser L2 emitted from the optical fibre connector 300 is prevented from causing operator eye injuries.

A person skilled in the art could appreciate that the above-described embodiments are only examples, and improvements could be made by a person skilled in the art, and the various structures described in the embodiments may be freely combined without conflicting in configuration or principle.

Although the present invention has been explained with reference to the accompanying diagrams, the aim of the embodiments disclosed in the diagrams are to provide examples of preferred embodiments of the present invention, and may not be interpreted as limiting the present invention.

Although certain embodiments representative of the overall inventive concept have been shown and described, a person skilled in the art could appreciate, any changes could be made to these embodiments, as long as these do not depart from the principles and spirit of the present overall inventive concept, the scope of the present invention being defined by the claims and their equivalents.

It should be noted that the word "comprises" does not exclude other components or steps, and the word "a" or "an" does not exclude a plurality. Furthermore, the absence of any component numbering in the claims should not be interpreted as limiting the scope of the present invention.

The invention claimed is:

1. An optical fibre adapter dust cap comprising:
a transparent material;
an insertion section;
a side section;
an external end section; and
a reflective surface, the reflective surface being positioned such that when the insertion section is fitted in a first port of an optical fibre adapter and an optical fibre connector is inserted into a second port of the optical fibre adapter:
(i) a light emitted from an indicator lamp hits a first side of the reflective surface, and is then reflected towards the external end section of the dust cap by the reflective surface, and is output from the external end section of the dust cap; and
(ii) a laser emitted from an optical fibre in the optical fibre connector hits a second side of the reflective surface, and is then reflected towards the side section of the dust cap by the reflective surface.

2. The optical fibre connector dust cap according to claim 1, wherein when the dust cap is fitted in the first port of the optical fibre adapter, an angle between the reflective surface and an axis of the optical fibre adapter is larger than 0 degree and less than 90 degrees.

3. The optical fibre connector dust cap according to claim 2, wherein when the dust cap is fitted in the first port of the optical fibre adapter, the angle between the reflective surface and the axis of the optical fibre adapter is larger than 30 degrees and less than 60 degrees.

4. The optical fibre connector dust cap according to claim 3, wherein when the dust cap is fitted in the first port of the optical fibre adapter, the angle between the reflective surface and the axis of the optical fibre adapter is equal to 45 degrees.

5. The optical fibre connector dust cap according to claim 1, wherein the external end section of the dust cap is provided with a light output surface, the light emitted from the indicator lamp being output through the light output surface.

6. The optical fibre connector dust cap according to claim 5, wherein the light output surface is arranged perpendicular to an axis of the optical fibre adapter.

7. The optical fibre connector dust cap according to claim 6, wherein the insertion section is adapted to be inserted into and retained within the first port of the optical fibre adapter; and the reflective surface is positioned in the insertion section.

8. The optical fibre connector dust cap according to claim 7, wherein a bottom section of the insertion section comprises a chamber, and the reflective surface is an inclined wall surface of the chamber.

9. The optical fibre connector dust cap according to claim 8, wherein the dust cap is provided with a flange between the insertion section and the external end section; and when the dust cap is fitted in the first port of the optical fibre adapter, the flange abuts against an external end surface of the first port of the optical fibre adapter.

10. The optical fibre connector dust cap according to claim 9, wherein the indicator lamp is an LED lamp.

11. The optical fibre connector dust cap according to claim 10, wherein the indicator lamp is provided on a bottom wall of the optical fibre adapter.

12. An optical fibre connection assembly, comprising:
an optical fibre adapter having a first port and a second port opposite to the first port, an indicator lamp being provided at the first port;
an optical fibre connector inserted into the second port of the optical fibre adapter; and
a dust cap having an insertion section fitted in the first port of the optical fibre adapter to seal the first port, the dust cap further comprising:
a transparent material;
a side section;
an external end section; and
a reflective surface, the reflective surface being positioned such that:
(i) a light emitted from the indicator lamp hits a first side of the reflective surface, and is then reflected towards the external end section of the dust cap by the reflective surface, and is output from the external end section of the dust cap; and
(ii) a laser emitted from an optical fibre in the optical fibre connector hits a second side of the reflective surface, and is then reflected towards the side section of the dust cap by the reflective surface.

13. The optical fibre connection assembly according to claim 12, wherein an electronic chip is provided in the optical fibre connector and stores information identifying the optical fibre; and
a signal reader is provided on the optical fibre adapter to read the identification information of the optical fibre stored in the electronic chip.

14. The optical fibre connection assembly according to claim 13, wherein the signal reader and the indicator lamp are both mounted on a circuit board; and
the circuit board is mounted in a bottom section of the optical fibre adapter.

15. The optical fibre connection assembly according to claim 14, wherein the optical fibre adapter comprises a transparent material.

* * * * *

UNITED STATES PATENT AND TRADEMARK OFFICE
CERTIFICATE OF CORRECTION

PATENT NO. : 10,241,276 B2
APPLICATION NO. : 15/559303
DATED : March 26, 2019
INVENTOR(S) : Xiongliang Chai et al.

Page 1 of 1

It is certified that error appears in the above-identified patent and that said Letters Patent is hereby corrected as shown below:

In the Claims

Column 7, Line 26, Claim 2: "fibre connector" should read --fibre adapter--

Column 7, Line 31, Claim 3: "fibre connector" should read --fibre adapter--

Column 7, Line 36, Claim 4: "fibre connector" should read --fibre adapter--

Column 7, Line 41, Claim 5: "fibre connector" should read --fibre adapter--

Column 7, Line 46, Claim 6: "fibre connector" should read --fibre adapter--

Column 7, Line 50, Claim 7: "fibre connector" should read --fibre adapter--

Column 8, Line 1, Claim 8: "fibre connector" should read --fibre adapter--

Column 8, Line 5, Claim 9: "fibre connector" should read --fibre adapter--

Column 8, Line 11, Claim 10: "fibre connector" should read --fibre adapter--

Column 8, Line 13, Claim 11: "fibre connector" should read --fibre adapter--

Signed and Sealed this
Sixteenth Day of March, 2021

Drew Hirshfeld
*Performing the Functions and Duties of the
Under Secretary of Commerce for Intellectual Property and
Director of the United States Patent and Trademark Office*